Patented Aug. 29, 1950

2,520,276

UNITED STATES PATENT OFFICE 2,520,276

HALOGENATED COMPOUNDS OF THE CHOLENIC ACID SERIES

Nicholas Thomas Farinacci, New York, N. Y.

No Drawing. Application August 6, 1947,
Serial No. 766,901

9 Claims. (Cl. 260—397.1)

This invention relates to halogenated carboxylic steroid acids of the cholenic acid series and a method of producing the same.

A process for the manufacture of 3-acetoxy, 5,6 dihalogeno bisnorcholenic acid, for example, was described by Fernholz: Liebig's Ann. der Chem., 507: 128 (1933) and consists in bringing the 5,6-halogenated 3-acetoxy stigmasterol into reaction with an oxidant to form the corresponding substituted bisnorcholenic acid produced by the oxidation of the C22—C23 double bond. The other acids of this series, the nor-, etio- and cholenic acids may be produced by the oxidation of other steroids, for example of 4,5 dihalogeno cholestenone.

According to the invention these steroids having a carboxyl in the side chain by treatment with such substances which serve as reagents to substitute for the hydrogens in the alpha and beta position to the carboxyl group as, for example, sulfuryl and phosphoryl halides, iodine and the like, are converted into the corresponding alpha and beta halogeno compounds of the cholenic acid series.

The reaction may, for example, be illustrated in detail by the following scheme for the bisnorcholenic acids

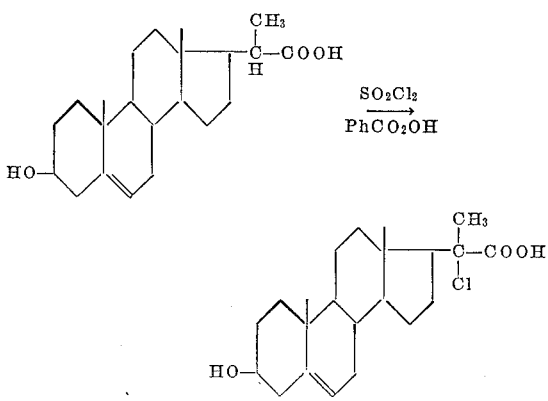

The halogenated carboxylic steroid acids may be dehydrohalogenated to derivatives with unsaturated double bonds between the carbon atoms 17 and 20,20 and 21, e. g. to produce alpha-beta unsaturated acids. These may be oxidized to the 17-keto derivatives and the alpha keto acid. The $\Delta^{20,21}$ acids are preferably halogenated and then dehydrohalogenated to produce $\Delta^{17,20}$ beta halogenated acids which may be converted to 17 keto steroids by oxidation. The alpha keto acids may be treated with Grignard or reduced to alpha hydroxy acids and dehydrated to acrylic acids.

The beta halogenated etiocholenic acid derivatives may be dehydrohalogenated and hydrogen halide added to produce the alpha halogeno acids. These may be converted to α keto acids which may be decarboxylated to 20 keto- 21 hydrocarbon derivatives. The final products obtainable in accordance with the invention are in part compounds of therapeutic value or are useful for the preparation of such compounds.

The following examples illustrate the invention.

Example 1

72 grams of 3-acetoxy-5-6 dichloro bisnorcholenic acid are treated with 11 grams of sulfuryl chloride and 0.1 gram of benzoyl peroxide and 13 grams of carbon tetrachloride and are heated gently under reflux in the dark for one and one-half hours. Then there is added 40 grams of thionyl chloride and heating is continued for four hours more. The excess of volatile reagents are distilled off in vacuum and the residue recrystallized from toluene. There is thus obtained a mixture of 3-acetoxy-5,6 dichloro-bisnorcholenic 17,20 and 21 chloro acids which may be fractionated by recrystallization.

Example 2

75 grams of 3-acetoxy 5,6 dichloro-norcholenic acid are treated as described in Example 1. There is thus obtained a mixture of the 3-acetoxy 5,6 dichloro-norcholenic acids with alpha and beta chloro substituents.

Instead of sulfuryl chloride, also other halogenating agents can be employed, as for example, phosphoryl chloride or bromide and the like.

Also the reaction is not limited to the acids of the cholenic acid series. Thus, in addition, for example, the cholenic acid halides and also their esters or their other derivatives with converted hydroxyl or keto groups, in which these hydroxyl or keto groups can easily be restored by hydrolysis, can be employed as starting materials.

The reaction can be carried out by the customary methods as is known for substitutive halogenation: thus the process can be conducted in the presence of solvents, catalysts and the like.

The term "cholenic acid series" as employed herein embraces not only the saturated but also the nuclearly unsaturated compounds and includes the bisnorcholenic, etiocholenic, norcholenic, and cholenic acids with various nuclear substituents, The term "steroid" as employed herein embraces not only the saturated but also the nuclearly unsaturated 10,13 dimethyl perhydrocyclopentano phenanthrenes with various nuclear substituents.

Changes and variations from the foregoing illustrations may be made within the scope of the invention defined in the specification and claims annexed hereto.

I claim:

1. Process for the manufacture of alpha and beta to the carboxy residue halogenated compounds of the cholenic acid series wherein they are treated with a sulfuryl halide in the presence of benzoyl peroxide catalyst.

2. Process as in claim 1, in which the starting material is a 5,6 dihalo-, 3- acyloxy- compounds of the cholenic acid series.

3. Process as in claim 1, in which the starting material is a 4,5 dihalo-, 3- keto- compounds of the cholenic acid series.

4. Process as in claim 1, wherein a phosphoryl halide is the halogenating agent.

5. Process as in claim 1, in the presence of chloroform.

6. Process for the manufacture of alpha and beta to the carboxy residue halogenated compounds of the cholenic acid series wherein they are treated with a sulfuryl halide in the presence of benzoyl peroxide and chloroform.

7. Process as in claim 6, wherein phosphoryl halide is the halogenating agent.

8. Process for the manufacture of the 17,20 and 21 chlorinated, 3- acetoxy-, 5,6 dichloro-bisnorcholenic acids which comprises reacting 3-acetoxy, 5,6 dichloro-bisnorcholenic acid with sulfuryl chloride in the presence of benzoyl peroxide and chloroform.

9. Process as in claim 8, wherein phosphorylchloride is the chlorinating agent.

NICHOLAS THOMAS FARINACCI.

REFERENCES CITED

The following references are of record in the file of this patent:

UNITED STATES PATENTS

| Number | Name | Date |
| --- | --- | --- |
| 2,249,911 | Oppenauer | July 22, 1941 |

FOREIGN PATENTS

| Number | Country | Date |
| --- | --- | --- |
| 544,051 | Great Britain | Mar. 25, 1942 |